US006647443B1

(12) United States Patent
Schultz et al.

(10) Patent No.: US 6,647,443 B1
(45) Date of Patent: Nov. 11, 2003

(54) MULTI-QUEUE QUALITY OF SERVICE COMMUNICATION DEVICE

(75) Inventors: Thomas A. Schultz, Hillsboro, OR (US); Steve Isabelle, Newton, MA (US)

(73) Assignee: Intel Corporation, Santa Clara, CA (US)

( * ) Notice: Subject to any disclaimer, the term of this patent is extended or adjusted under 35 U.S.C. 154(b) by 434 days.

(21) Appl. No.: 09/752,287

(22) Filed: Dec. 28, 2000

(51) Int. Cl.$^7$ .......................... G06F 13/14; G06F 13/20
(52) U.S. Cl. .................. 710/52; 710/33; 710/34; 710/53; 710/60
(58) Field of Search ................. 710/33, 34, 52, 710/53, 60

(56) References Cited

U.S. PATENT DOCUMENTS

| | | | | |
|---|---|---|---|---|
| 5,507,005 A | * | 4/1996 | Kojima et al. | 710/52 |
| 5,918,074 A | * | 6/1999 | Wright et al. | 710/52 |
| 6,247,071 B1 | * | 6/2001 | Cardoso, Jr. | 710/52 |
| 6,359,883 B1 | * | 3/2002 | Lechleider | 370/389 |
| 6,532,503 B1 | * | 3/2003 | Lindeborg et al. | 710/52 |

FOREIGN PATENT DOCUMENTS

EP     0752801 A2  *  2/1997  .......... H04Q/11/04

* cited by examiner

*Primary Examiner*—Rehana Perveen
(74) *Attorney, Agent, or Firm*—Paul G. Nagy

(57) ABSTRACT

Disclosed are a system and method of transmitting and receiving data through a peripheral device coupled to a transmission medium. The peripheral device is coupled to a host processing system through a data bus. The peripheral device includes logic to discriminate among data cells based upon virtual channels and maintains a receive buffer for storing data cells for each virtual channel. When a buffer fills, the peripheral device transmits the data cells to a receive buffer queue associated with a virtual channel and maintained in the host processing system. The host processing system may also maintain a plurality of transmit buffer queues for storing data cells for transmission in virtual channels. The peripheral device may also comprise logic for scheduling data cells in the transmit buffer queues for transmission according a quality of service (QoS) associated with one or more virtual channels.

35 Claims, 4 Drawing Sheets

MULTI-QUEUE QUALITY OF SERVICE COMMUNICATION DEVICE

BACKGROUND

1. Field

The subject matter disclosed herein relates to communication systems. In particular, the subject matter disclosed herein relates to communication systems implemented in computing platforms.

2. Information

With the convergence of communication and computing technology, processing platforms have been integrated with communication system to provide enhanced service features and resource allocation. Such a processing platform is typically coupled to a communication network and hosts processes for transmitting data to and receiving data from nodes on the communication network. A processing platform may be configured to allocate resources to provide a quality of service (QoS) for particular communication service supported by the processing platform.

A processing platform integrated as part of a communication system may include a peripheral device coupled to a communication medium and a host processing system to process data received from the peripheral device and transmit data to the transmission medium through the peripheral device. A data bus typically transmits data between the peripheral device and the host processing system.

Increased data rates in transmission media have been accompanied by an increase in data traffic between peripheral devices and host processing systems in data busses coupling the peripheral devices to the host processing systems. Accordingly, there is a need to address such increases in data traffic in the data busses.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Figure 1:
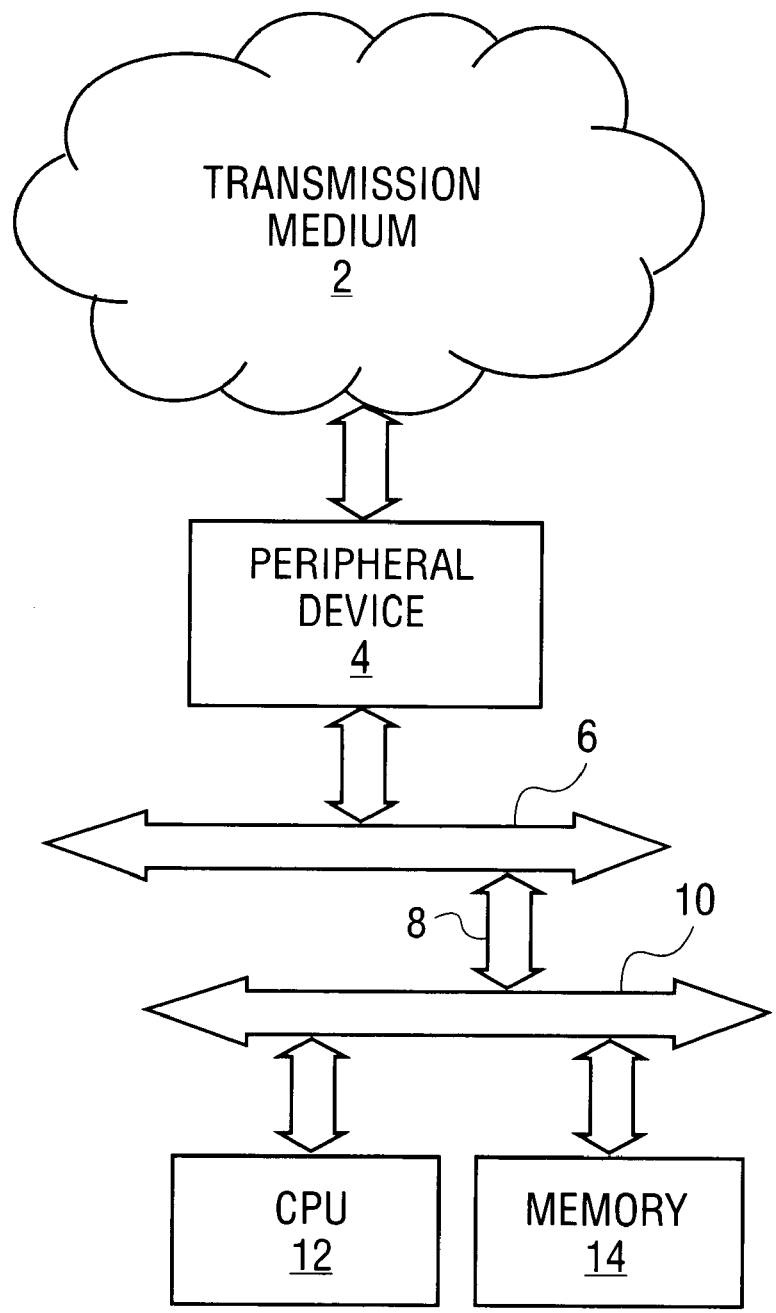
FIG. 1 shows a schematic diagram of a system for transmitting data to or from a transmission medium according to an embodiment of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

A "data cell" as referred to herein relates to a quantity of data which may be formatted for transmission in a medium according to a communication protocol. For example, a data cell may comprise a payload portion with data which is to be transmitted under a communication protocol and a header portion having control data. However, this is merely an example of a data cell and embodiments of the present invention are not limited in this respect.

A "virtual channel" as referred to herein relates to a system for a unidirectional transport of data cells having a common destination. A "quality of service" (QoS) as referred to herein relates to a desired level of service to be provided with a communication service. For example, a desired quality of service may be associated with a virtual channel in transporting data cells to a destination. Also, such a desired QoS may specify that the data cells in a virtual channel are to be transmitted at or about a given transmission rate. However, this is merely an example of how a quality of service may be applied and embodiments of the present invention are not limited in this respect.

A "constant bit rate" or "isochronous" QoS relates to processes where data is to be delivered within certain time constraints. For example, it may be desired to provide audio data or multimedia streams in a data transmission system providing an isochronous or constant bit rate (QoS) to ensure that data is delivered as fast as it is displayed and to ensure that the audio is synchronized with the video. However, this is merely an example of a data transmission system providing an isochronous or constant bit rate QoS and embodiments of the present invention are not limited in this respect.

A "processing system" as discussed herein relates to a combination of hardware and software resources for accomplishing computational tasks. However, embodiments of the present invention are not limited in this respect. A "host processing system" relates to a processing system which may be adapted to communicate with a "peripheral device." For example, a peripheral device may provide inputs to or receive outputs from an application process hosted on the host processing system. However, embodiments of the present invention are not limited in this respect.

A "data bus" as referred to herein relates to circuitry for transmitting data between devices. For example, a data bus may transmit data between a host processing system and a peripheral device. However, this is merely an example and embodiments of the present invention are not limited in this respect. A "bus transaction" as referred to herein relates to an interaction between devices coupled in a bus structure wherein one device transmits data addressed to one or more other devices through the bus structure.

A "shared memory" as referred to herein relates to memory at a host processing system which is accessible by both a peripheral device and one or more processes hosted at the host processing system. For example, a shared memory may store data cells which have been stored by a peripheral device for retrieval by a process at a host processing system or store data cells which have been stored by a process at the host processing system for retrieval by the peripheral device. However, these are merely examples of a shared memory and embodiments of the present invention are not limited in this respect.

A data bus may transfer data between a host processing system and a peripheral device using a "direct memory access" (DMA) through which data may be transferred in the data bus independently of one or more processes hosted at the host processing system. For example, a peripheral device may act as a bus master to initiate bus transactions to store or retrieve data in shared memory at the host processing system. However, these are merely examples of DMA systems and embodiments of the present invention are not limited in this respect.

A "transmission medium" as referred to herein relates to any media suitable for transmitting data. A transmission medium may include any one of several mediums including, for example transmission cabling, optical transmission medium or wireless transmission media. However, these are merely examples of transmission media and embodiments of the present invention are not limited in this respect.

A "buffer" or "data buffer" as referred to herein relates to a memory or location in a memory in which data may be temporarily stored and then retrieved. For example, data transmitted from a peripheral device to a host processing system may be stored in a buffer located in a memory of the host processing system to be retrieved by processes hosted on the host processing system. Similarly, data to be transmitted to a peripheral device from a host processing system may be stored in a buffer in the memory of the host processing system prior to being transmitted to the peripheral device. Also, a peripheral device may store data in a buffer in a memory of the peripheral device prior to transmitting the data to a host processing system or prior to transmitting the data through a transmission medium. However, these are merely examples of a buffer or data buffer, and embodiments of the present invention are not limited in this respect.

A "buffer descriptor" as referred to herein relates to a data structure comprising a pointer to a memory location storing an associated data buffer. Such a buffer descriptor may also have status information relating to whether the associated data buffer contains data to be retrieved by a process. However, this is merely an example of a buffer descriptor and embodiments of the present invention are not limited in this respect.

A "buffer descriptor queue" as referred to herein relates to one or more buffer descriptors organized in a queue. Data buffers associated with buffer descriptors in a buffer descriptor queue may be located in a single memory or multiple memories and at contiguous or non-contiguous memory locations. For example, a buffer descriptor queue may define an ordered arrangement of descriptors corresponding to an order of corresponding data buffers. However, this is merely an example of a buffer descriptor queue and embodiments of the present invention are not limited in this respect.

A "transmission offset" as referred to herein relates to a delay in between the transmission of consecutive data cells in a transmission medium. For example, a peripheral device transmitting data cells in a virtual channel through a transmission medium may maintain a transmission offset between consecutive data cells to satisfy a QoS associated with virtual channel. However, this is merely an example of how a transmission offset may be employed and embodiments of the present invention are not limited in this respect.

Briefly, an embodiment of the present relates to a system and method of processing data received from a transmission medium. A host processing system may maintain a plurality of host buffer queues in a memory and receive data cells from a peripheral device coupled to the host processing system. Before transmitting the data cells to the host processing system, the peripheral device may store the data cells in one of a plurality of peripheral buffers maintained in a memory of the peripheral device. When a peripheral buffer is full, one or more data cells stored in the filled peripheral buffer from the peripheral device to the host processing system through a data bus. However, this is merely an example embodiment of the present invention and other embodiments of the present invention are not limited in this respect.

Another embodiment of the present invention relates to a system and method of transmitting data on a medium. A host processing system may maintain a plurality of buffers where each of the buffers comprises one or more data cells, and at least one of the buffers is associated with a QoS. A peripheral device coupled to the host processing system may schedule the transmission of data cells in one or more virtual channels based upon a QoS associated with at least one of the virtual channels. However, this is merely an example embodiment of the present invention and other embodiments of the present invention are not limited in this respect.

FIG. 1 shows a schematic diagram of a system for transmitting data to or from a transmission medium 2 according to an embodiment of the present invention. A host processing system comprises a central processing unit (CPU) 12 and memory 14 coupled by a system bus 10, and may host application processes. The memory 14 may be any combination of random access memory (RAM) or non-volatile memory devices (e.g., hard disk or flash memory). However, this is merely an example of a host processing system and embodiments of the present invention are not limited in this respect.

A peripheral device 4 is coupled to communicate with the transmission medium 2. The transmission medium 2 may be any one of several transmission mediums suitable for transmitting data according to a communication protocol including, for example, coaxial cabling, category five cabling, twisted pair lines, optical transmission media or wireless transmission media. However, these are merely examples of transmission media and embodiments of the present invention are not limited in this respect.

The peripheral device 4 may be any one of several devices adapted for transmitting data through the transmission medium 2 according to a protocol such as, for example, digital subscriber line (DSL) protocols, wireless communication protocols, Ethernet, synchronous optical network (SONET) or digital cable transmission protocols. However, these are merely examples of communication protocols which may be employed by a peripheral device to transmit data in, and receive data from transmission media and embodiments of the present invention are not limited in this respect.

The peripheral device 4 is coupled to the system bus 10 through a data bus 6 and bridge 8. The system bus 6 may be a peripheral components interconnection (PCI) bus or universal serial bus (USB). However, these are merely examples of the bus 6 and embodiments of the present invention are not limited in this respect. According to an embodiment, the peripheral device 4 may receive data from the transmission medium 2 to be transmitted to the CPU 12 and memory 14 as inputs to processes hosted the CPU 12 and memory 14. Similarly, processes hosted on the CPU 12 and memory 14 may forward data to the peripheral device 4 to be transmitted through the transmission medium 2.

Figure 2:
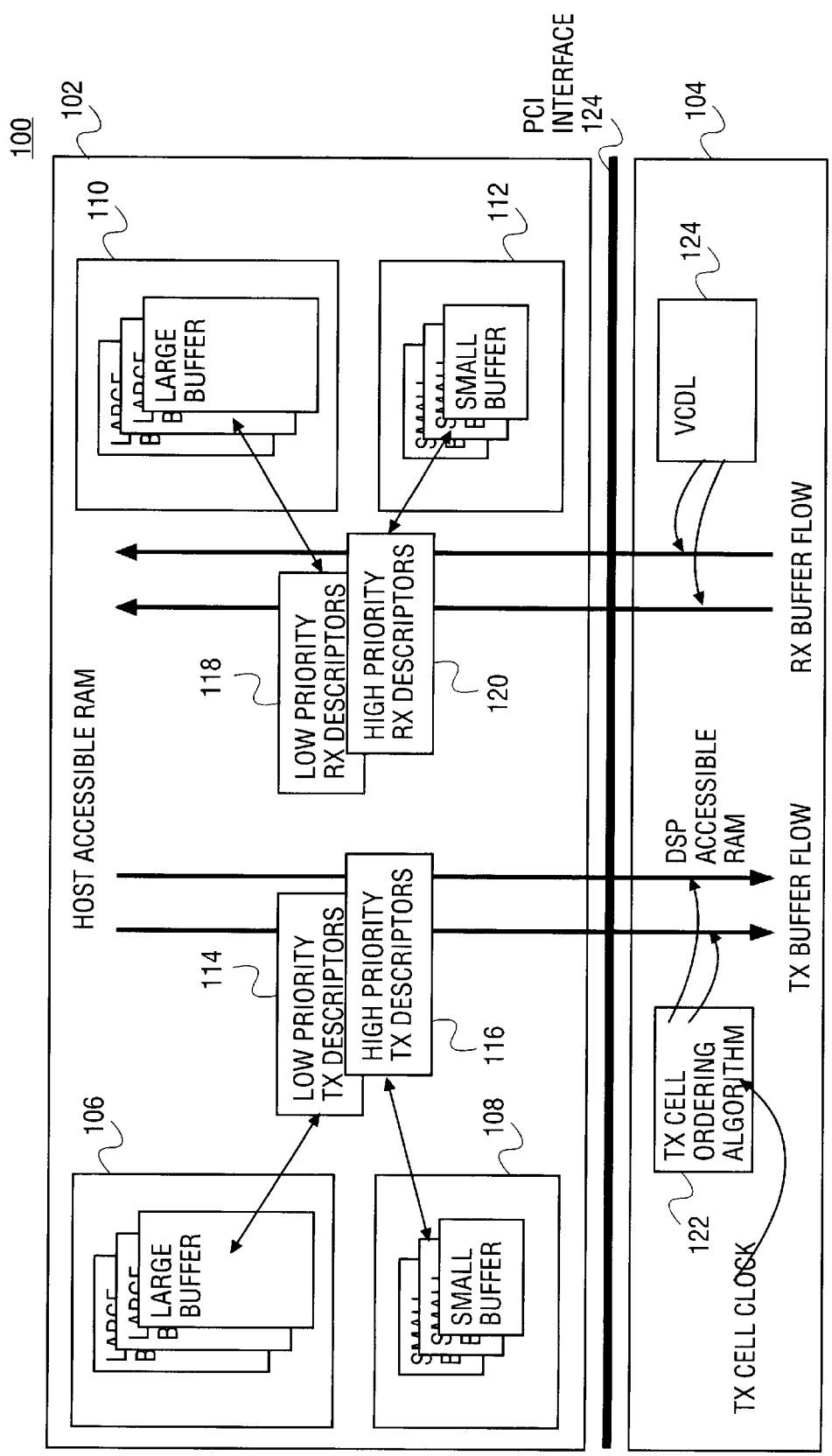
FIG. 2 shows a schematic diagram of a system for transmitting data cells between a peripheral device and a host processing system according to an embodiment of the present invention.

FIG. 2 shows a schematic diagram of a system for transmitting data cells between a peripheral device 104 and a host processing system 102 according to an embodiment of the present invention. The host processing system 102 and the peripheral device 104 may communicate through a PCI interface 124. However, this is merely an example of how a host processing system and peripheral device may communicate and embodiments of the present invention are not limited in this respect. In the illustrated embodiment, the host processing system 102 hosts processes for receiving and/or transmitting data cells in virtual channels according to an asynchronous transfer mode (ATM). However, this is merely an example of a communication protocol which may be used to communicate with the processes hosted on the host processing system 102 and embodiments of the present invention are not limited in this respect.

In the illustrated embodiment, the host processing system 102 maintains transmit buffer descriptor queues 114 and 116 which reference to transmit data buffers 106 and 108 for storing data cells to be transmitted in a transmission medium through the peripheral device 104. However, the host processing system 102 may maintain three or more transmit buffer descriptor queues and embodiments of the present invention are not limited in this respect. In the illustrated embodiment, each of the transmit buffer queues may be associated with a virtual channel and at least one of the buffer queues may be associated with a QoS for the associated virtual channel.

In the illustrated embodiment, the peripheral device 104 may transmit data cells to a transmission medium serially. In an embodiment according to an ATM method of transmitting data cells, the peripheral device 104 may serially transmit ATM data cells from multiple virtual channels in cell transmission intervals. Here, cell ordering logic 122 in the peripheral device 104 may determine how cells may be ordered for transmission in the medium based upon a QoS associated with one or more of the virtual channels. The cell ordering logic 122 may comprise any combination of logic in an application specific integrated circuit (ASIC) or firmware. However, this is merely an example of how cell ordering logic may be implemented on a peripheral device and embodiments of the present invention are not limited in this respect.

According to an embodiment of the present invention, the host processing system 102 and peripheral device 104 may implement any one of several different QoS schemes to allocate transmission resources between or among a plurality of virtual channels. For example, the host processing system 102 and peripheral device 104 may implement a pure priority scheme in which data cells of a lower priority buffer descriptor queue are not transmitted unless no data cells of a higher priority buffer descriptor queue are available to transmit. In another example, the host processing system 102 and peripheral device 104 may implement a round robin scheme in which transmission resources are to be evenly allocated among the buffer descriptor queues having data cells available for transmission. In yet another example, the host processing system 102 and peripheral device 104 may implement a scheme to transmit data cells at about a constant bit rate for one or more of the virtual channels. However, these are merely examples of QoS schemes which may be implemented by a host processing system and a peripheral device, and embodiments of the present invention are not limited in this respect.

In the illustrated embodiment, for example, transmit buffer descriptor queue 116 may reference to data buffers 108 containing data cells to be transmitted in a virtual channel. Such a virtual channel associated with a QoS which may be supported using a constant bit rate transmission scheme (e.g., a QoS applied in audio or video streaming, or telephony). However, this is merely an example of type of QoS which may be associated with a virtual channel and embodiments of the present invention are not limited in this respect.

To provide a constant bit rate QoS in a virtual channel, the cell ordering logic 122 may interleave data cells for the constant bit rate virtual channel in cell transmission intervals with data cells of other virtual channels to approximate a data rate in the constant bit rate virtual channel. According to an embodiment, the cell ordering logic 122 selects data cells from transmit data buffers 106 and 108 referenced by the transmit buffer descriptor queues 114 and 116 to be transmitted in the transmission medium at cell transmission intervals.

According to an embodiment, the cell ordering logic 122 may maintain a constant bit rate QoS associated with a virtual channel by maintaining a transmission offset between consecutive data cells (for the virtual channel) transmitted through the transmission medium. Data cells to be transmitted in the virtual channel may have information in a data field relating to the intended QoS such as a related transmission offset. Such information in the data field of the data cells may then be used by the cell ordering logic 122 in scheduling data cells for transmission in the transmission medium at cell transmission intervals. However, this is merely an example of how transmission offset may be maintained between consecutive data cells in a constant bit rate virtual channel, and embodiments of the present invention are not limited in this respect.

In one embodiment, for example, the information in the data field of the data cells may relate to a number of cell transmission intervals to be maintained between consecutive data cells in a virtual channel associated with a QoS. In this example, the cell ordering logic 122 may schedule the transmission of data cells of other virtual channels in between consecutive transmissions of data cells in the virtual channel associated with the QoS. For example, the peripheral device 104 may receive a data cell from the host processing system 102 to be transmitted in a constant bit rate virtual channel having an associated priority. To maintain a transmission offset between consecutive data cells in a constant bit rate virtual channel, the cell ordering logic 122 may initiate DMA transactions with the host processing system 102 to retrieve data cells for transmission in other virtual channels. The cell ordering logic 122 may then schedule the transmission of the retrieved data cells at cell transmission intervals between the transmission of consecutive data cells in the constant bit rate virtual channel. However, this is merely an example of how a peripheral device may interleave the transmission of data cells at transmission intervals between consecutive data cells in constant bit rate virtual channel, and embodiments of the present invention are not limited in this respect.

According to an embodiment of the present invention, processes hosted on the host processing system 102 may initialize the offset information in a data field of data cells which are to be transmitted in a constant bit rate virtual channel. The data cells having the initialized offset information may then be stored in a transmit data buffer (e.g., transmit data buffer 106 or 108) referenced by a buffer descriptor queue associated with the constant bit rate virtual channel (e.g., buffer descriptor queue 114 or 116). The peripheral device 104 may then retrieve data cells from a data buffer referenced by a descriptor in a buffer descriptor queue, and store the retrieved data cells in a local memory at the peripheral device 104. At each cell transmission interval, the cell ordering logic may decrement the offset information such a data cell stored in the local memory until the offset information is fully decremented (e.g., decremented to zero). When the offset information is fully decremented, the cell ordering logic 122 may schedule the data cell for transmission in the transmission medium. However, this is merely an example of how a peripheral device may employ transmission offset information in scheduling the transmission of data cells in a constant bit rate virtual channel and embodiments of the present invention are not limited in this respect.

In the illustrated embodiment, the peripheral device 104 may initiate the retrieval of data cells from the data buffers 106 and 108 using DMA transactions. In the course of such a DMA transaction, the peripheral device 104 may initially select a buffer descriptor queue (e.g., buffer descriptor queue 114 or 116) based upon a QoS associated with one or more buffer descriptor queues. In a pure priority scheme, for example, the peripheral device 104 may select the highest priority buffer descriptor queue referencing to any transmit data buffer storing data cells to transmit. The peripheral device 104 may then select lower priority buffer descriptor queues when the data buffers referenced by the higher priority buffer descriptor queues are empty. In a scheme where one of the buffer descriptor queues is associated with a constant bit rate virtual channel, for example, the peripheral device 104 may select a buffer descriptor queue associated with the constant bit rate virtual channel (to locate data cells for transmission in the constant bit rate virtual channel) or another buffer descriptor queue (to locate data cells for transmission between consecutive data cells in the constant bit rate virtual channel). However, these are merely examples of how a peripheral device may select a buffer descriptor queue and embodiments of the present invention are not limited in this respect.

According to an embodiment, the buffer descriptor queue 116 may be associated with a virtual channel having a constant bit rate QoS. In the illustrated embodiment, each descriptor in the buffer descriptor queue 116 may reference to a data buffer 108 for storing a single data cell for transmission in the constant bit rate virtual channel. Upon transmitting a locally stored data cell in the constant bit rate virtual channel (e.g., after offset information in the locally stored data cell is fully decremented), the peripheral device 104 may select the buffer descriptor queue 116 to locate a transmit data buffer 108 storing a subsequent data cell to be transmitted in the constant bit rate virtual channel. Also, the peripheral device 104 may select buffer descriptor queue 114 to locate one or more data buffers 106 storing data cells for transmission between consecutive data cells in the constant bit rate virtual channel. However, this is merely an example of how a peripheral device may select buffer descriptor queues to provide a constant bit rate QoS in a virtual channel and embodiments of the present invention are not limited in this respect.

Upon selection of a buffer descriptor queue, the peripheral device 104 may access a buffer descriptor in the selected buffer descriptor queue to locate an associated transmit data buffer in memory. For example, the buffer descriptor may store a pointer to a memory address of the associated transmit data buffer. Data cells stored in the associated transmit data buffer may then be retrieved and transmitted to the peripheral device in a bus transaction. However, this is merely an example of how a peripheral device may access data cells stored in a transmit data buffer and embodiments of the present invention are not limited in this respect.

In the illustrated embodiment, the peripheral device 104 may access either the buffer descriptor queues 114 and 116 through a PCI bus transaction through the PCI interface 124. Upon locating a transmit data buffer from a descriptor in a buffer descriptor queue, the peripheral device 104 may initiate a DMA transaction to retrieve the data cells in the located transmit data buffer. The retrieved data cells may then be transmitted to the peripheral device 104 through the PCI interface. However, this is merely an example of how a host processing system may transmit data cells to a peripheral device located by information in a buffer descriptor, and embodiments of the present invention are not limited in this respect.

Figure 3:
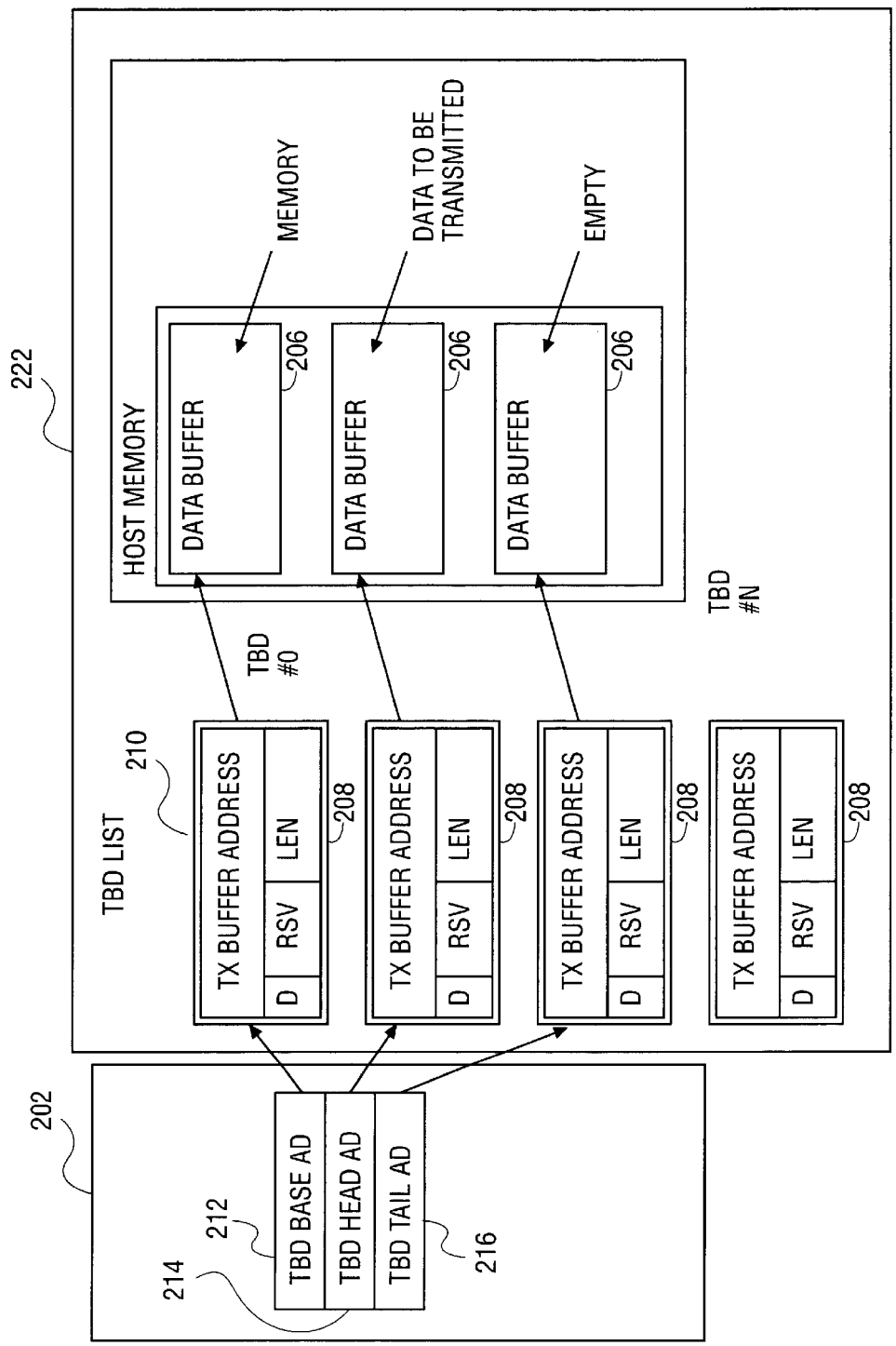
FIG. 3 shows a schematic diagram of a system for storing data to be transmitted through a peripheral device according to an embodiment of the present invention.

FIG. 3 shows a schematic diagram of a system for storing data at a host processing system 212 to be transmitted through a peripheral device 202 according to an embodiment of the present invention. A host processing system 212 may maintain a plurality of transmit buffer descriptor queues, each transmit buffer descriptor queue corresponding with a virtual channel. In the illustrated embodiment, a transmit buffer descriptor queue 210 comprises a plurality of buffer descriptors 208. Each buffer descriptor 208 may comprise information identifying a memory location of a transmit buffers 206 which may contain one or more data cells to be transmitted in a virtual channel associated with the buffer descriptor queue 210. While FIG. 3 shows a single transmit buffer descriptor queue 210 and associated transmit data buffers corresponding to a virtual channel, it should be understood that the host processing system 222 may maintain a transmit buffer descriptor queue and transmit buffers for each virtual channel to be transmitted through the peripheral device 202.

Each buffer descriptor 208 comprises a TX buffer address indicating a buffer location in a memory at the host processing system. A base pointer 212 to the buffer descriptor queue 210 may be specified by the host processing system 222 and remain static following initialization. A head pointer 214 points to a buffer descriptor 208 corresponding to a buffer that is to be transmitted to the peripheral device 202 in response to the next selection of the buffer descriptor queue 210 to locate a transmit data buffer 206. The head pointer 214 may be initialized by the host processor 222 and then advanced upon access to the buffer descriptor queue 210 for locating a data buffer 206 (for retrieval and transmission to the peripheral device 202). In the illustrated embodiment, each transmit buffer 206 may store up to a set number of data cells. An access to a transmit data buffer 206 (following an access to a corresponding buffer descriptor 208) may initiate the retrieval of all data cells in the transmit buffer 206 located at the address in the descriptor 208 referenced by the head pointer 214 in a single DMA transaction. The retrieved data cells may then be transmitted to the peripheral device 202 in a single bus transaction.

The host processing system 222 may also initialize a tail pointer 216 which points to the last transmit buffer 206 filled by processes hosted at the host processing system 222. In the illustrated embodiment, the tail pointer 216 points to a descriptor 208 corresponding with the next empty transmit buffer 206 to be filled. When the empty buffer is filled, the tail pointer 216 is advanced. When the tail pointer 216 and the head pointer 214 point to the same descriptor 208, the transmit buffer queue 204 is empty.

According to an embodiment, the peripheral device 104 (FIG. 2) may sequentially receive data cells from a transmission medium in one or more virtual channels. The received data cells may then be forwarded to processes hosted on the host processing system 102. The peripheral device 104 may comprise virtual channel discrimination logic (VCDL) 124 which may associate received data cells with a virtual channel. In an embodiment in which the virtual channels are formed according to an ATM system, for example, the VCDL 124 may associate a received data cell with a virtual channel based upon header information in the data cell. However, this is merely an example of how the VCDL 124 may associate a received data cell with a virtual channel and embodiments of the present invention are not limited in this respect.

The peripheral device 104 may also comprise a local memory to maintain one or more buffers for received data cells. For example, the peripheral device 104 may maintain a "peripheral buffer" in a local memory for each virtual channel to store received data cells associated with the virtual channel. According to an embodiment, each peripheral buffer may store up to a set number of received data cells for an associated virtual channel. When a peripheral buffer is filled, the peripheral device 104 may transmit the data cells in the filled buffer to the host processing system 102 in a single bus transaction. The data cells transmitted to the host processing system 102 may then be stored in a receive buffer queue (e.g., receive buffer queue 110 or 112) associated with a virtual channel.

According to an embodiment, the peripheral device 104 may receive data cells from a virtual channel associated with a QoS (e.g., a QoS which may be supported by isochronous or constant bit rate data transmission). A corresponding peripheral buffer at the peripheral device 104 may have a capacity to store up to a set number of data cells before the peripheral device 104 initiates a bus transaction to transmit the contents of the buffer to the host processing system 102. For other virtual channels not associated with such a QoS, for example, corresponding peripheral buffers may have a capacity to store a greater number of data cells before the peripheral device initiates a bus transaction to transmit the contents of the peripheral buffer to the host processing system 102.

According to an embodiment, a host processing system may maintain a plurality of receive buffer descriptor queues, one receive buffer descriptor queue for each virtual channel. Data cells of a particular virtual channel transmitted from a peripheral buffer to the host processing system may then be stored in a receive buffer referenced by a descriptor in a receive buffer descriptor queue associated with the particular virtual channel. The embodiment of FIG. 2 illustrates that the host processing system 102 maintains receive buffer descriptor queues 118 and 120 comprising descriptors referencing to receive data buffers 110 and 112. Data buffers 110 and 112 may store data cells received from an associated virtual channel. Data cells transmitted from a peripheral buffer to the host processing system 102 may then be stored in a receive buffer of an associated receive data buffer 110 or 112. A process hosted on the host processing system 102 associated with a virtual channel may then retrieve data cells from a receive data buffer of the virtual channel.

Figure 4:
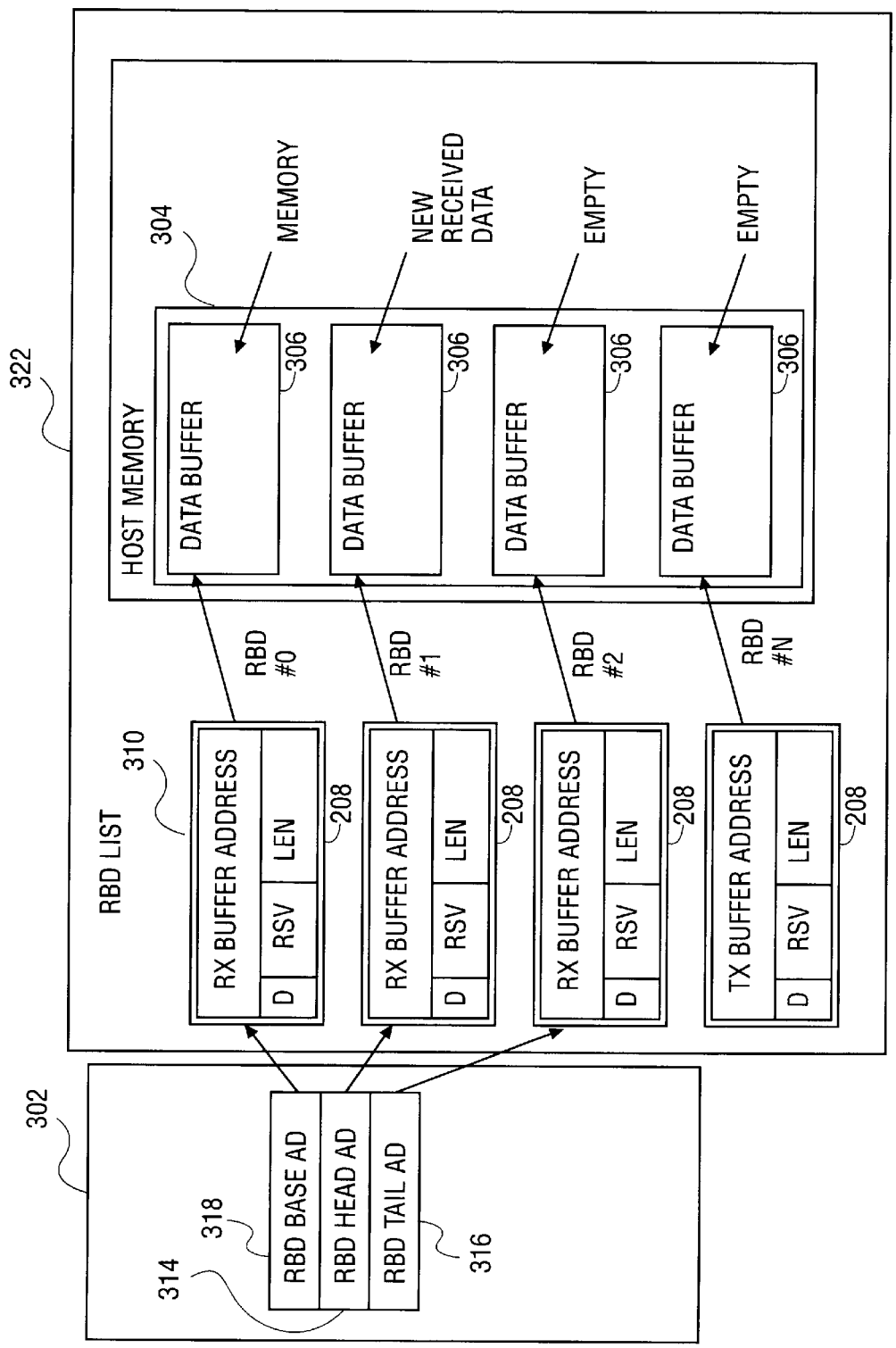
FIG. 4 shows a schematic diagram of a system for storing data received from a peripheral device according to an embodiment of the present invention.

FIG. 4 shows a schematic diagram of a system for storing data cells received at a host processing system 312 from a peripheral device 302 according to an embodiment of the present invention. Here, the host processing system 312 may maintain a plurality of receive buffer descriptor queues corresponding to virtual channels. In the illustrated embodiment, a receive buffer descriptor queue 310 comprises a plurality of buffer descriptors 308. Each buffer descriptor 308 comprises information for locating a corresponding receive data buffer 306 which contains one or more data cells transmitted to the host processing system 312 from the peripheral device 302 in a bus transaction. The data cells transmitted in the bus transaction may stored in a receive data buffer 306 by a single DMA transaction. While FIG. 4 shows a single receive buffer descriptor queue 310 corresponding to a virtual channel, it should be understood that the host processing system 312 may maintain a receive buffer descriptor queue referencing corresponding receive data buffers 306 for each of a plurality of virtual channels providing data to processes hosted on the host processing system 312.

Each buffer descriptor 308 comprises an RX buffer address of a location in memory at the host processing system 312 corresponding to a receive buffer 306. A base pointer 312 to the descriptor list 310 may be specified by the host processing system 312 to indicate the beginning of the descriptor list 310 in memory and remain static following initialization. A head pointer 314 points to a descriptor 314 having an address to a first empty buffer in the receive buffer queue 304. The head pointer 314 may be initialized by the host processing system 312 and then advanced upon receipt of data cells to be stored in a receive data buffer 306. When a receive buffer 306 is filled (e.g., upon receipt of data cells in a bus transaction from the peripheral device 302), the head pointer 314 may be advanced.

The host processing system 312 may also initialize a tail pointer 316 which points to a buffer descriptor 308 containing the address of an empty receive buffer 306 before the last receive buffer 306 which has not been completely processed by the processes hosted on the host processing system 312. As the processes hosted on the host processing system 312 complete processing the data cells in a receive buffer 306, the tail pointer 316 may be advanced to the next descriptor 308. Accordingly, the receive buffers between the buffers at the addresses in the descriptors 310 referenced by the tail pointer 316 and the head pointer 314 are not empty.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method of processing data received from a transmission medium comprising:
   maintaining a plurality of host buffers in a system memory of a host processing system, the host processing system comprising a CPU coupled to the system memory to access the host buffers;
   receiving data cells at a peripheral device coupled to the host processing system;
   storing each received data cell in one of a plurality of peripheral buffers maintained in a memory of the peripheral device, each of the peripheral buffers corresponding with one of the host buffers; and
   when a peripheral buffer is filled, transmitting one or more data cells stored in the filled peripheral buffer from the peripheral device to the host buffers through a data bus.

2. The method of claim 1, wherein the method further comprises:
   associating each received data cell with one of a plurality of virtual channels; and
   selecting a peripheral buffer queue for storing the received data cell based upon the associated virtual channel.

3. The method of claim 1, wherein the method further comprises:

maintaining a buffer descriptor queue in the memory of the host processing system, the buffer descriptor queue being associated with one of the peripheral buffers, the buffer descriptor queue comprising one or more descriptors, each descriptor referencing a memory location of a host buffer;

receiving one or more data cells transmitted from the associated peripheral buffer; and storing the one or more received data cells in a host buffer referenced by a descriptor in the buffer descriptor queue.

4. The method of claim 3, the method further comprising:

retrieving an address from a descriptor in the buffer descriptor queue; and retrieving one or more of the transmitted data cells stored at the retrieved address.

5. The method of claim 4, wherein the method further comprises executing a procedure associated with a virtual channel to process the retrieved data cells as inputs to the virtual channel.

6. The method of claim 1, wherein the data bus is a PCI data bus and the method further comprises transmitting the one or more data cells stored in the peripheral buffer to the host processing system in a single PCI bus transaction.

7. An apparatus comprising:

a host processing system comprising a CPU and a system memory, the system memory comprising a plurality of host buffer queues which are accessible to the CPU; and a peripheral device comprising:

a plurality of peripheral buffers to store data cells received from a transmission medium; and logic to transmit one or more data cells stored in a peripheral buffer to the host buffer queues upon detection that the peripheral buffer is full.

8. The apparatus of claim 7, wherein the peripheral device further comprises:

logic to associate each data cell with a virtual channel; and logic to store the data cell in a peripheral buffer associated with the virtual channel.

9. The apparatus of claim 7, wherein the host processing system further comprises:

logic to maintain a buffer descriptor queue associated with a peripheral buffer;

logic to receive one or more data cells transmitted from the associated peripheral buffer; and logic to store the one or more received data cells at a memory location referenced by a descriptor in the buffer descriptor queue.

10. The apparatus of claim 9, wherein the host processing system further comprises logic to store one or more of the received data cells at an address retrieved from the descriptor.

11. The apparatus of claim 10, wherein the host processing system hosts a process associated with a virtual channel to process the stored data cells as inputs to the virtual channel.

12. The apparatus of claim 7, wherein the apparatus further comprises a PCI data bus coupled between the peripheral device and host processing system, and the peripheral device further comprises logic to transmit the one or more data cells stored in the peripheral buffer to the host processing system in a single PCI bus transaction.

13. A peripheral device comprising:

a plurality of peripheral buffers to store data cells received from a transmission medium, each peripheral buffer corresponding with a one of a plurality of host buffer queues maintained in a system memory of a host processing system, the host buffer queues being accessible by a CPU in the host processing system; and logic to transmit one or more data cells stored in a peripheral buffer to the host buffer queues upon detection that the peripheral buffer is full.

14. The peripheral device of claim 13, wherein the peripheral device further comprises:

logic to associate each of the received data cells with a virtual channel; and logic to store each received data cell in a peripheral buffer based upon the associated virtual channel.

15. The peripheral device of claim 13, wherein the peripheral device further comprises logic to transmit the data cells in the filled peripheral buffer in a single PCI bus transaction.

16. A method of transmitting data on a medium, the method comprising:

maintaining a plurality of buffers in a system memory of a host processing system, the host processing system comprising a CPU capable of accessing the buffers, each buffer comprising one or more data cells and one or more of the buffers being associated with a quality of service; and at a peripheral device coupled to the host processing system, scheduling the transmission of data cells through the medium based upon a quality of service associated with at least one of the buffers in the system memory.

17. The method of claim 16, wherein the method further comprises ordering data cells for transmission through the medium to substantially maintain a quality of service associated with at least one buffer.

18. The method of claim 17, wherein at least one of the buffers is associated with a constant bit rate virtual channel and the method further comprises ordering data cells for transmission through the medium to approximate a data rate associated with the isochronous virtual channel.

19. The method of claim 16, wherein the method further comprises:

maintaining a list of buffer descriptors in the memory of the host processing system, each descriptor having a buffer address of a buffer associated with the list of buffer descriptors; and retrieving the buffer address from a descriptor in the list of descriptors of the selected buffer queue.

20. The method of claim 19, wherein the method further comprises:

retrieving one or more data cells from a buffer located at the retrieved buffer address; and moving a pointer to a subsequent descriptor in the list of descriptors of the selected buffer queue.

21. An apparatus comprising:

a host processing system comprising a system memory and a CPU, the system memory comprising a plurality of host buffers accessible by the CPU, each of the host buffers comprising one or more data cells and at least one of the buffers being associated with a quality of service; and a peripheral device coupled to the host processing system, the peripheral device comprising logic to schedule transmission of data cells from the host buffers based upon a quality of service associated with at least one of the host buffers.

22. The apparatus of claim 21, wherein the peripheral device further comprises logic to order data cells from the buffers for transmission through a medium to substantially maintain a quality of service associated with at least one buffer.

23. The apparatus of claim 22, wherein at least one of the buffers is associated with a constant bit rate virtual channel and the peripheral device further comprises logic to order data cells for transmission through the medium to approximate a data rate associated with the constant bit rate virtual channel.

24. The apparatus of claim 21, wherein the host processing system further comprises:
   logic to maintain a list of descriptors, each descriptor having a buffer address of a buffer in the buffer queue; and
   logic to retrieve the buffer address from a descriptor in the list of descriptors.

25. A peripheral device comprising:
   logic to initiate a direct memory access transaction with a system memory of a host processing system to receive data cells, each data cell having a destination associated with one of a plurality of virtual channels; and
   logic to order the data cells for transmission in a medium based upon a quality of service associated with at least one of the virtual channels.

26. The peripheral device of claim 25, the peripheral device further comprising logic to order data cells from for transmission through a medium to substantially maintain a quality of service associated with at least one of the virtual channels.

27. The peripheral device of claim 26, wherein at least one of the virtual channels comprises a constant bit rate virtual channel and the peripheral device further comprises logic to order data cells for transmission through the medium to approximate a data rate associated with the constant bit rate virtual channel.

28. The peripheral device of claim 27, wherein data cells to be transmitted in the constant bit rate virtual channel comprise offset data indicating a transmission offset and wherein the peripheral device comprises logic to schedule transmission of data cells in the constant bit rate virtual channel based upon the offset data in the data cells.

29. The peripheral device of claim 28, wherein the peripheral device further comprises:
   memory to store a data cell for transmission in the constant bit rate virtual channel;
   logic to decrement the offset data of stored data cell at cell transmission intervals; and
   logic to schedule transmission of the stored data cell upon fully decrementing the offset data.

30. The peripheral device of claim 25, wherein the peripheral device further comprises logic to receive the one or more data cells of a virtual channel in a single bus transaction.

31. The method of claim 1, wherein transmitting the one or more data cells stored in the filled peripheral buffer from the peripheral device to the host buffers further comprises initiating a direct memory access transaction on the data bus.

32. The apparatus of claim 7, wherein the logic to transmit one more data cells stored in the peripheral buffer to the host buffer queues further comprises logic to initiate a direct memory access transaction to write the one or more data cells to the host buffer queues in response to detection that the peripheral buffer is full.

33. The peripheral device of claim 13, wherein the logic to transmit one more data cells stored in the peripheral buffer to the host buffer queues further comprises logic to initiate a direct memory access transaction to write the one or more data cells to the host buffer queues in response to detection that the peripheral buffer is full.

34. The method of claim 16, the method further comprising initiating one or more direct memory access transactions to retrieve the scheduled data cells from the buffers.

35. The apparatus of claim 21, wherein the peripheral device further comprises logic to initiate direct memory access transactions to retrieve the data cells from the buffers.

* * * * *